Sept. 3, 1957     E. J. WELLS     2,805,074

CHUCK

Filed April 6, 1955

INVENTOR.
Earl J. Wells
BY ECKHOFF & SLICK, Attys.

A member of the firm

United States Patent Office 2,805,074
Patented Sept. 3, 1957

2,805,074

CHUCK

Earl J. Wells, Comptche, Calif.

Application April 6, 1955, Serial No. 499,619

4 Claims. (Cl. 279—46)

This invention relates to a chuck and a spindle adapted for use in holding high speed rotary tools such as grinding or cutting tools.

In my Patent No. 2,621,452, I disclosed and claimed a chuck and spindle which is capable of operating at high speeds and which can be stopped and locked easily for changing or tightening tools. The present invention relates to a similar device of improved design.

The chuck and spindle of the present invention form a more compact structure than my prior device and one which is more readily adapted for direct mounting on a motor shaft. Further, the device of the present invention utilizes fewer and simpler parts and is easier to manufacture and to maintain. Still another advantage of my present structure is an adjustable brake take-up mechanism whereby wear on the brake parts may be easily compensated.

Thus, the device of my present invention has all of the features disclosed and claimed in my Patent 2,621,452, as well as numerous additional advantages.

Figure 1:
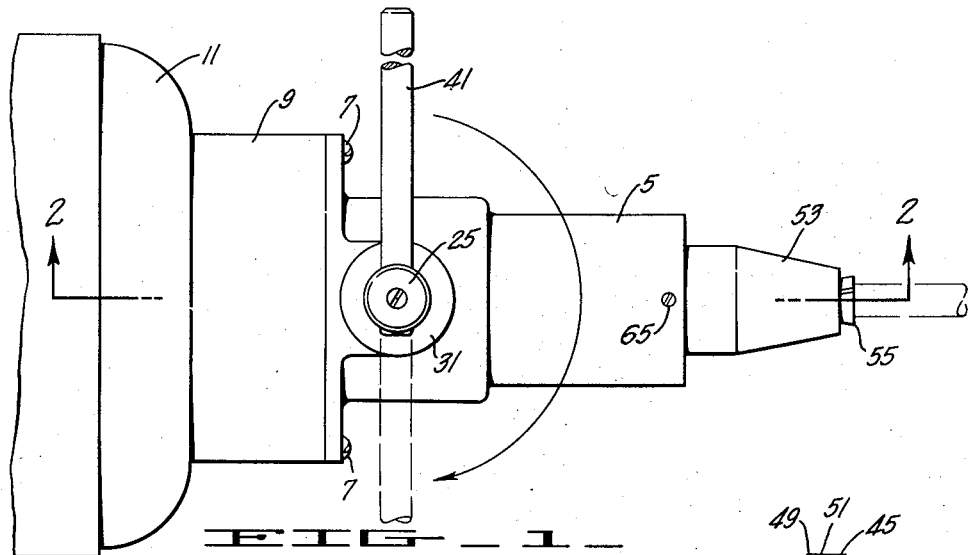
Figure 1 is a plan view of one embodiment of the present invention.

Referring now to the drawings by reference characters, the device consists of a main housing 5 having attached thereto by screws 7, or other suitable means, a clutch housing 9. Housing 9 may be attached directly to the bell of an electric motor 11 by means of screws or bolts 13. Mounted within the main housing 5 is sliding member 15. Member 15 is mounted to freely slide within the housing. The outer races of bearings 17 form a slip fit with housing 5, so that the member 15 and the bearings 17 may be shifted as a unit as is hereinafter described. Member 15 has an annular recess 19 therein which is adapted to receive an eccentric mounted pin 21. Pin 21 has a reduced shoulder portion 23 thereon, which fits into an eccentric hole of the actuating shaft 25. Shaft 25 has an annular recess 27 therein, and the shaft is held loosely in place by means of the screw 29, which fits into recess 27. The shaft 25 is also provided with a cap 31 which is fastened thereto by means of a set screw 33. A spring 35 is provided, one end of which, 37, is anchored in the housing 5 and the other end, 39, is anchored in the cap 31. The shaft 25 is also provided with an operating handle 41.

The member 15 has a shaft 43 passing therethrough, shaft 43 being free to turn within the member 15. To one end of the shaft 43 is attached a metal disc 45, which serves as a clutch face. The housing 9 is attached to a motor, as has heretofore been described, and the shaft of the motor 47 is provided with a disc 49, which is of generally the same size as disc 45. In addition, either disc 45 or 49 may be provided with a conventional clutch disc facing material 51.

A chuck 53 is provided at the opposite end of shaft 43, which is held in place by means of a collet 55, which is threadably mounted in the shaft 43, as shown. The chuck 53 has an upturned shoulder 57 thereon and a hollow interior portion into which is fitted a heavy compression spring 59. The compression spring 59 is held between the chuck 53 and the bearing of the rotor 15 by a washer 61. Mounted in the front of the housing 5 is a brake ring 63, which can be adjusted by means of threads 64 and held in any desired position by means of the set screw 65 which bears against the ring 63 at an interrupted segment 67 of the threads 64. Mounted within the collet 55 is a collet follower 69, which is held loosely in place by means of the compression spring 71. When a tool 73 is inserted into the collet 55, collet follower 69 is pushed to the rear and when no tool is placed in the collet, follower 69 comes forward and gives the collet something to grip against, preventing chattering when the device is operated without a tool in place.

Figure 2:
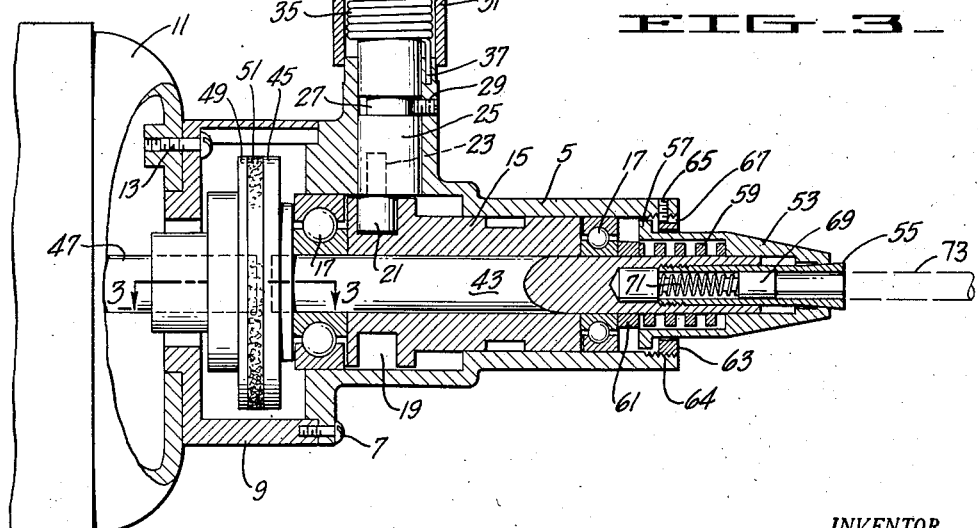
Figure 2 is a sectional view on the lines 2—2 of Figure 1.

The spring 35 is adjusted by means of the collar 31 and the collar is locked in place by means of set screw 33 in such a manner that the clutch discs 45 and 49 are held in engagement. As one turns the handle 41, acting against the spring 35, the clutch discs are first separated so that power is no longer applied to the shaft 43. As the handle 41 is turned further, the collar 57 on the chuck 53 engages the ring 63 rapidly braking the shaft 43 and associated parts to a stop. As the handle is turned still further, shaft 43 is moved to the right in Figure 2, causing the spring 59 to become compressed and the chuck 53 to disengage from the collet 55, allowing the collet to expand so that a tool 73 can be easily removed and replaced.

Figure 3:
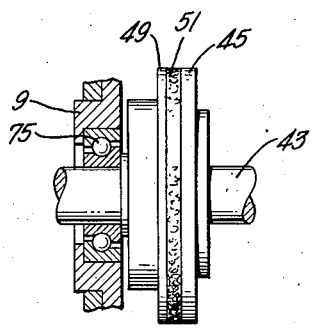
Figure 3 is a fragmentary sectional view on the lines 3—3 of Figure 2 showing an alternate bearing which may be used in certain instances.

The structure thus far described is satisfactory when the device is used with a motor or other driving means which is equipped with a thrust bearing. However, it will be seen that thrust is placed on the shaft 47 by the action of the clutch so that if the motor or other driving means is not equipped with a thrust bearing, housing 9 may be equipped with a thrust bearing 75, as is shown in Figure 3.

I claim:

1. A spindle holder comprising a housing, a sliding member mounted within said housing, a shaft mounted for rotation within said sliding member and moving axially with said sliding member, said shaft having means for selectively engaging a source of rotary mechanical power at one end thereof, said shaft having a chuck mounted at the opposite end, said chuck having a collar thereon, a shoulder mounted in said main housing adapted to engage said collar, a collet having a tapered outside wall mounted on the end of said shaft and normally held in a closed position by said chuck by pressure of a spring tending to force the chuck over the collet and adapted to be released by relative movement of said chuck and said shaft, said movement being accomplished by pressure on said collar from said shoulder when the sliding member moved toward the chuck, an annular recess on said sliding member and a pin fitting in said recess and adapted to move the sliding member axially, and an actuating shaft mounted at right angles to the axis of the first mentioned shaft, said actuating shaft having an eccentric hole therein wherein said pin is fixedly secured, said actuating shaft having a biasing spring whereby the means for selectively engaging a source of rotary mechanical power is normally held in engagement with said power source.

2. The structure of claim 1 wherein the shoulder comprises an annular ring threadably mounted in said housing, said ring having an interrupted thread thereon, and a set screw mounted in said housing whereby the annular ring can be locked into position.

3. The structure of claim 1 wherein the housing is adapted to be mounted on an electric motor bell and the means for engaging a source of rotary power is a clutch face adapted to engage a second clutch face mounted on the shaft of a motor.

4. The structure of claim 1 wherein said biasing spring is provided with an adjusting means, whereby the tension on the spring, and thus the said power engaging means can be adjusted by varying the tension of the spring.

References Cited in the file of this patent

UNITED STATES PATENTS

| | | |
|---|---|---|
| 1,241,659 | Ritz | Oct. 2, 1917 |
| 1,288,051 | Kylin | Dec. 17, 1918 |
| 1,417,228 | Blocker | May 23, 1922 |
| 2,152,733 | Elliott et al. | Apr. 4, 1939 |
| 2,225,377 | Mussari | Dec. 17, 1940 |
| 2,621,452 | Wells | Dec. 16, 1952 |